United States Patent
Huang et al.

(10) Patent No.: US 11,624,951 B2
(45) Date of Patent: Apr. 11, 2023

(54) FRAME ASSEMBLY, BACKLIGHT MODULE, AND DISPLAY DEVICE

(71) Applicants: Radiant(Guangzhou) Opto-Electronics Co., Ltd, Guangdong (CN); Radiant Opto-Electronics Corporation, Kaohsiung (TW)

(72) Inventors: Teng-Yi Huang, Kaohsiung (TW); Chih-Chan Chen, Kaohsiung (TW); Tsung-Chen Tung, Kaohsiung (TW); Che-Chia Hsu, Kaohsiung (TW); Chin-Cheng Hsieh, Kaohsiung (TW); Yung-Chieh Chao, Kaohsiung (TW); Chih-Hung Chung, Kaohsiung (TW)

(73) Assignees: RADIANT(GUANGZHOU) OPTO-ELECTRONICS CO., LTD, Guangdong (CN); RADIANT OPTO-ELECTRONICS CORPORATION, Kaohsiung (TW)

(*) Notice: Subject to any disclaimer, the term of this patent is extended or adjusted under 35 U.S.C. 154(b) by 0 days.

(21) Appl. No.: 17/547,191

(22) Filed: Dec. 9, 2021

(65) Prior Publication Data
US 2022/0155640 A1    May 19, 2022

Related U.S. Application Data

(63) Continuation of application No. PCT/CN2020/130041, filed on Nov. 19, 2020.

(51) Int. Cl.
*G02F 1/16753* (2019.01)
*G02F 1/13357* (2006.01)

(52) U.S. Cl.
CPC .............................. *G02F 1/133608* (2013.01)

(58) Field of Classification Search
CPC .................................................. G02F 1/133608
USPC .......................................................... 362/97.1
See application file for complete search history.

(56) References Cited

U.S. PATENT DOCUMENTS

| 10,775,553 | B1* | 9/2020 | Li | G02F 1/133308 |
|---|---|---|---|---|
| 10,976,484 | B2* | 4/2021 | Li | G02B 6/0081 |
| 2017/0269291 | A1* | 9/2017 | Wang | G02B 6/0088 |

FOREIGN PATENT DOCUMENTS

| CN | 102737546 A | 10/2012 |
|---|---|---|
| CN | 103454788 A | 12/2013 |
| CN | 204477946 U | 7/2015 |
| CN | 105988244 A | 10/2016 |

(Continued)

*Primary Examiner* — Christopher M Raabe
(74) *Attorney, Agent, or Firm* — CKC & Partners Co., LLC (57) ABSTRACT

A frame assembly includes a carrier and a frame. The carrier includes a bottom wall, and inner and outer side walls. The bottom wall is formed with an opening. The inner side wall is located in the opening. The inner and outer side walls extend from the bottom wall along an upright direction. The inner and outer side walls respectively include first inner and outer engaging structures. The outer side wall is spaced from the inner side wall. The frame includes a frame body, and inner and outer lateral walls. The inner and outer lateral walls extend from the frame body and respectively include second inner and outer engaging structures. The outer lateral wall is spaced from the inner lateral wall. The first and second inner engaging structures are engaged with each other, and the first and second outer engaging structures are engaged with each other.

19 Claims, 8 Drawing Sheets

(56) References Cited

FOREIGN PATENT DOCUMENTS

| CN | 106371238 A | 2/2017 |
|---|---|---|
| CN | 206193402 U | 5/2017 |
| CN | 206331747 U | 7/2017 |
| CN | 108020954 A | 5/2018 |
| CN | 210323673 U | 4/2020 |
| CN | 211905927 U | 11/2020 |
| CN | 213423652 U | 6/2021 |
| JP | 2011191455 A | 9/2011 |
| JP | 2020184005 A | 11/2020 |
| TW | M538306 U | 3/2017 |

* cited by examiner

FRAME ASSEMBLY, BACKLIGHT MODULE, AND DISPLAY DEVICE

RELATED APPLICATIONS

This application is a continuation application of International Application No. PCT/CN2020/130041 filed on Nov. 19, 2020, which is incorporated herein by reference.

BACKGROUND

Field of Invention

The present invention relates to a frame assembly, a backlight module, and a display device, and more particularly, to a frame assembly that is secured without using additional components, and a backlight module and a display device including the frame assembly.

Description of Related Art

Conventionally, in assembling of a front frame and a back plate of a backlight module, additional components are utilized for securing. For example, when the additional components are screws, the front frame and the back plate may be secured by means of fastening the screws. For another example, when the additional components are buckles, the front frame and the back plate may be engaged with each other by fixing one end of a buckle on the back plate and engaging the other end of the buckle into an engaging space of the front frame. However, such way of assembling requires more assembling time and component cost, and is disadvantageous for disassembling. When the screws are used, it is not aesthetic due to the exposure of the screws.

Therefore, how to reduce time and component cost in assembling the front frame and the back plate of the backlight module to make it aesthetic and easy for disassembling becomes an important issue.

SUMMARY

An objective of the present invention is to provide a frame assembly, a backlight module, and a display device for solving the aforementioned problems.

According to a first embodiment of the present invention, a frame assembly including a carrier and a frame is provided. The carrier includes a bottom wall, an inner side wall, and an outer side wall. The bottom wall is formed with an opening. The inner side wall is located in the opening and extends from the bottom wall along an upright direction away from the bottom wall, and the inner side wall includes a first inner engaging structure. The outer side wall extends from the bottom wall along the upright direction and is spaced from the inner side wall, and the outer side wall includes a first outer engaging structure. The frame includes a frame body, an inner lateral wall, and an outer lateral wall. The inner lateral wall extends from the frame body and includes a second inner engaging structure. The outer lateral wall extends from the frame body and is spaced from the inner lateral wall, and the outer lateral wall includes a second outer engaging structure. The first inner engaging structure and the second inner engaging structure are engaged with each other, and the first outer engaging structure and the second outer engaging structure are engaged with each other.

According to a second embodiment of the present invention, a frame assembly including a carrier and a frame is provided. The carrier includes a bottom wall, and an inner side wall and an outer side wall which extend from the bottom wall along an upright direction away from the bottom wall and are spaced from each other. The bottom wall is formed with an opening. The inner side wall includes a first inner engaging structure. The frame includes an inner lateral wall and an outer lateral wall spaced from each other, and the inner lateral wall includes a second inner engaging structure. The outer side wall of the carrier is engaged between the inner lateral wall of the frame and the outer lateral wall of the frame. The first inner engaging structure of the inner side wall and the second inner engaging structure of the inner lateral wall are engaged with each other and located in the opening of the bottom wall.

According to the frame assembly in the second embodiment, the outer side wall of the carrier may include a first outer engaging structure, the outer lateral wall of the frame may include a second outer engaging structure, and the first outer engaging structure and the second outer engaging structure may be engaged with each other.

According to the frame assembly in the first or second embodiment, a first accommodation space may be formed between the inner side wall and the outer side wall of the carrier, and a second accommodation space may be formed between the inner lateral wall and the outer lateral wall of carrier. The first accommodation space of the carrier may be configured to accommodate the inner lateral wall of the frame such that the first inner engaging structure and the second inner engaging structure are engaged with each other. The second accommodation space may be configured to accommodate the outer lateral wall of the carrier such that the first outer engaging structure and the second outer engaging structure are engaged with each other.

According to the frame assembly in the first or second embodiment, the first inner engaging structure and the first outer engaging structure may be misaligned with each other along a first direction.

According to the frame assembly in the first or second embodiment, the inner lateral wall and the outer lateral wall may extend toward a joining direction, and the frame may be engaged with the carrier along the joining direction.

According to a third embodiment of the present invention, a backlight module including the aforementioned frame assembly, an optical panel, and a light source is provided. The optical panel is disposed on the carrier and includes a bottom surface and at least one side. The light source corresponds to the bottom surface or the at least one side of the optical panel.

According to the backlight module in the third embodiment, the bottom wall of the carrier may be recessed to form a recessed space, and the light source may be disposed in the recessed space and may correspond to the bottom surface of the optical panel.

According to the backlight module in the third embodiment, the backlight module may further include at least one optical film. The optical film may include a fitting hole, and the inner side wall of the carrier can be embedded in the fitting hole.

According to a fourth embodiment of the present invention, a display device including the aforementioned backlight module and a display panel is provided, and the display panel is disposed over the backlight module.

According to the display device in the fourth embodiment, the frame may further include a supporting portion. The inner lateral wall and the outer lateral wall may extend toward a joining direction. An extension direction of the supporting portion may be perpendicular to the joining direction, and the supporting portion may be configured to support the display panel.

In contrast to the prior arts, the present invention provides a frame assembly, and a backlight module and a display device which include the frame assembly. The frame assembly can be secured without using additional components, which is advantageous for reducing assembling time and cost of components, and is aesthetic and easy for disassembling.

DETAILED DESCRIPTION

The forgoing and other technical content, features, effects of the present invention will be clearly presented in the detailed description of preferred embodiments with reference made to the accompanying drawings as follows. Directional terms, such as "up," "down," "left," "right," "front," "back," "bottom," "top," and the like, used in the following embodiments are merely directions with reference to the accompanying drawings. Therefore, the directional terms used herein are for illustration, and are not intended to limit the present invention. Further, in the following embodiments, the same or similar reference numbers are used to refer to the same or like elements.

In the present invention, two elements being substantially parallel to each other indicates that there is an included angle between the two elements, and the included angle is 0±10 degree(s), preferably 0±5 degree(s), and more preferably 0±3 degree(s), or the included angle is 180±10 degrees, preferably 180±5 degrees, and more preferably 180±3 degrees. In the present invention, two elements being substantially perpendicular to each other indicates that there is an included angle between the two elements, and the included angle is 90±10 degrees, preferably 90±5 degrees, and more preferably 90±3 degrees.

In the present invention, a backlight module may be used for providing a liquid crystal display (LCD) panel with a light source. Each element in the backlight module includes a bottom surface and a top surface, the definition of the bottom surface and the top surface is based on the LCD panel as a reference, in which for each element, a surface which is away from the LCD panel is defined as the bottom surface, and a surface which faces the LCD panel is defined as the top surface. Further, in the present invention, an element being disposed over another element indicates that the element is disposed on or over a top surface of the another element.

In the present invention, the directions mentioned herein, such as an upright direction and a joining direction, are the directions in which a frame assembly 100 is in an assembled configuration.

Figure 1:
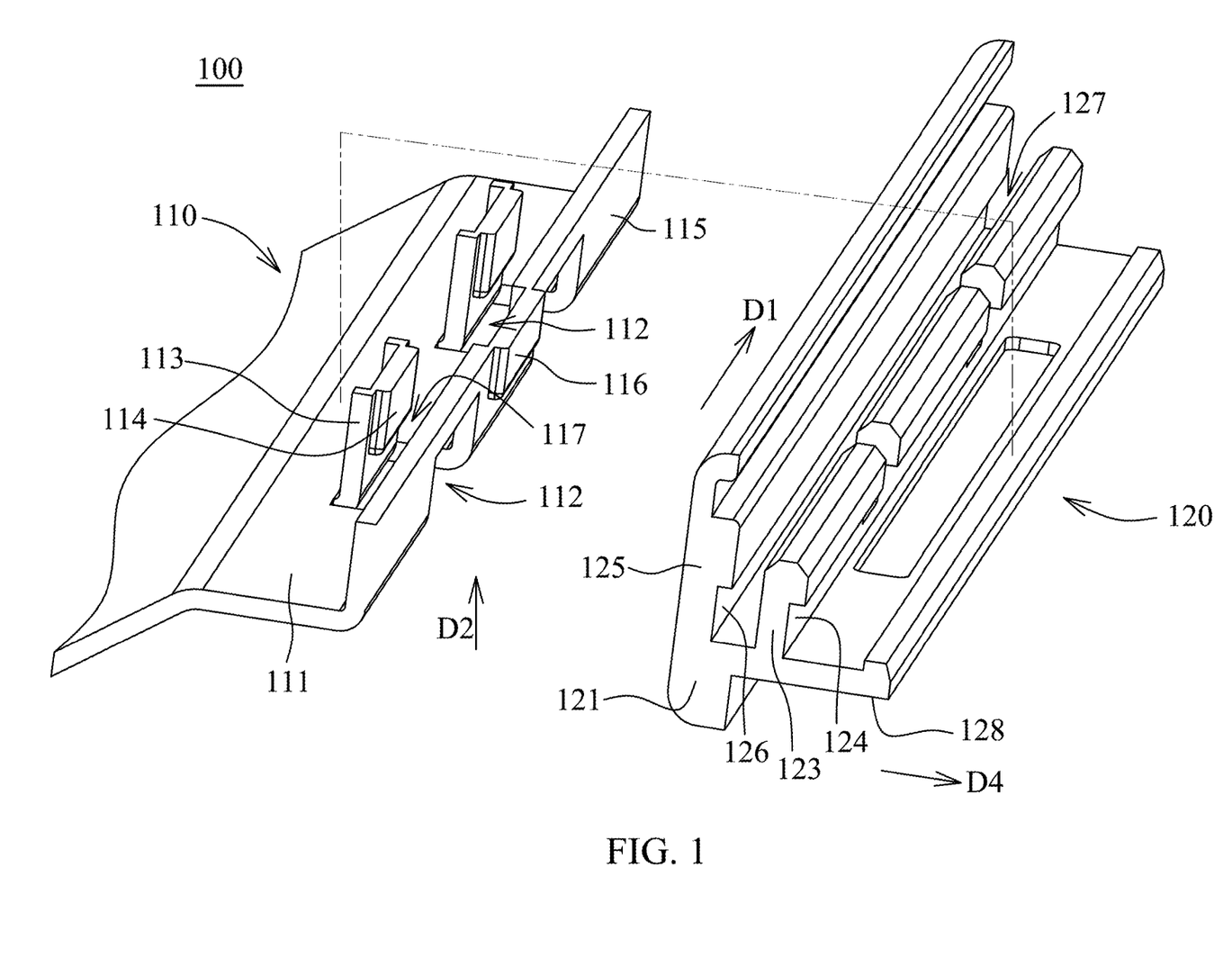
FIG. 1 is a partially-exploded schematic diagram of a frame assembly according to one embodiment of the present invention, in which a frame is in an inverted configuration from a carrier.
Figure 2:
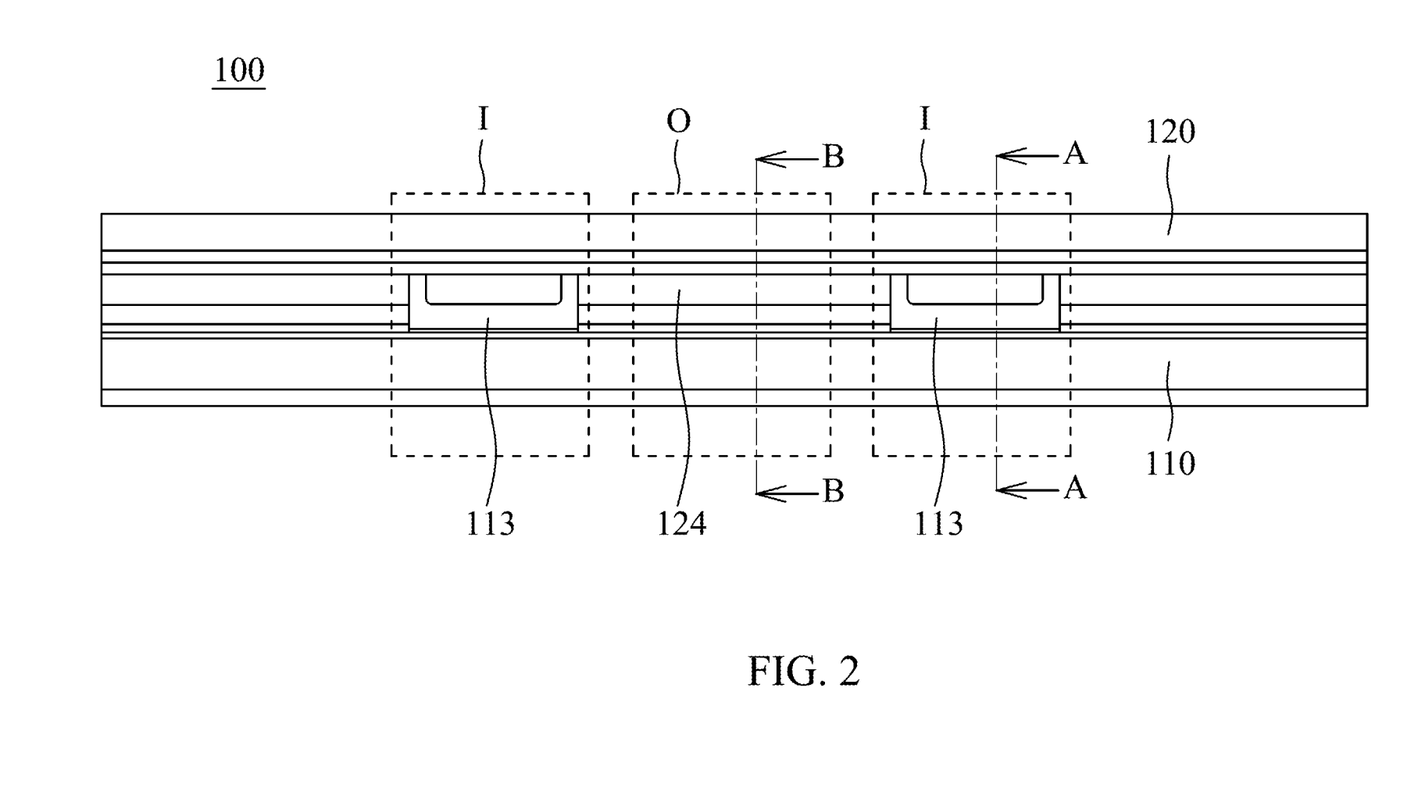
FIG. 2 is a left side schematic view of the frame assembly in FIG. 1 in the assembled state.
Figure 3:
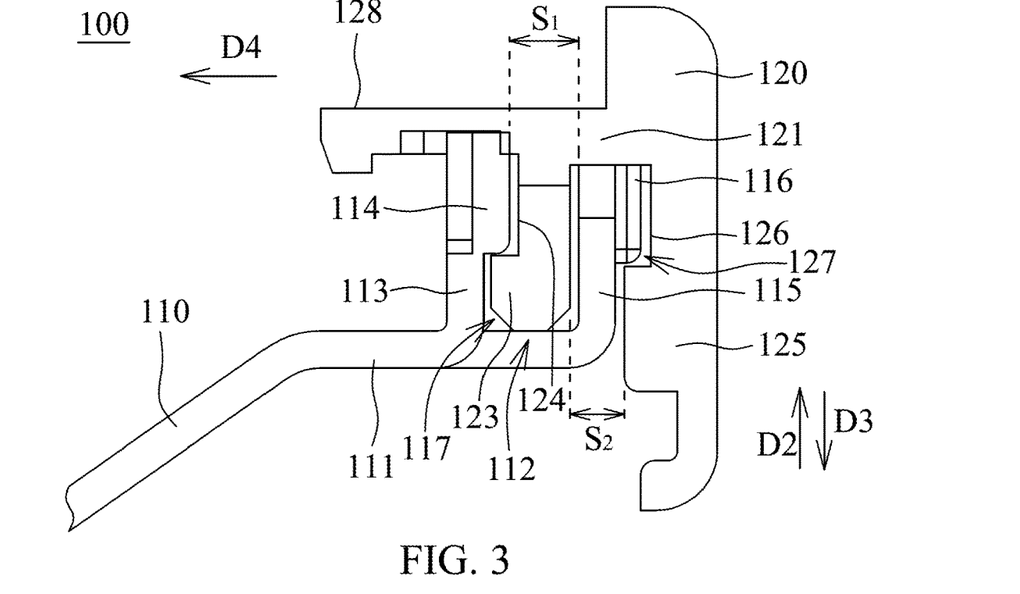
FIG. 3 is a cross-sectional schematic view of the frame assembly in FIG. 2 along a cutting line A-A.
Figure 4:
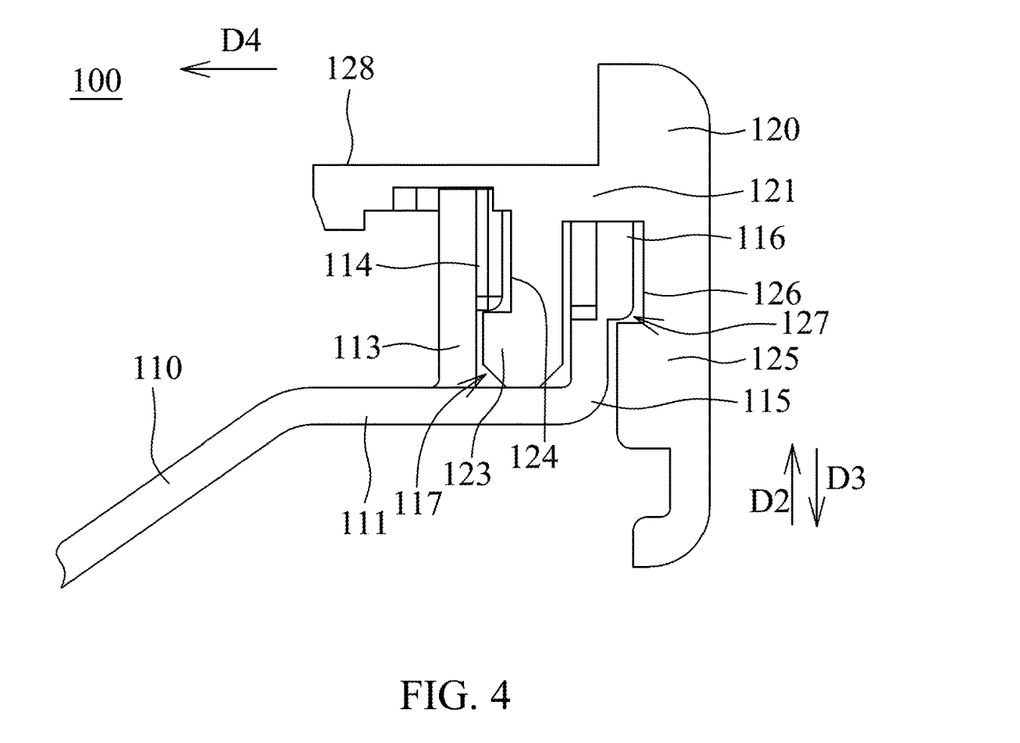
FIG. 4 is a cross-sectional schematic view of the frame assembly in FIG. 2 along a cutting line B-B.

Referring to FIG. 1 to FIG. 4, FIG. 1 is a partially-exploded schematic diagram of the frame assembly 100 according to one embodiment of the present invention, FIG. 2 is a left side schematic view of the frame assembly 100 in FIG. 1 in the assembled state, FIG. 3 is a cross-sectional schematic view of the frame assembly 100 in FIG. 2 along a cutting line A-A, and FIG. 4 is a cross-sectional schematic view of the frame assembly 100 in FIG. 2 along a cutting line B-B. The frame assembly 100 includes a carrier 110 and a frame 120. Additionally, it is noted that the frame 120 in FIG. 1 is in an inverted configuration from the carrier 110.

The carrier 110 includes a bottom wall 111, an inner side wall 113, and an outer side wall 115. The inner side wall 113 and the outer side wall 115 extend from the bottom wall 111 along an upright direction D2 which is away from the bottom wall 111, and the inner side wall 113 and the outer side wall 115 are spaced from each other. As shown in FIG. 3, the foregoing description "the inner side wall 113 and the outer side wall 115 are spaced from each other" indicates that there is a first spacing distance S1 between the inner side wall 113 and the outer side wall 115, such that a first accommodation space 117 is formed between the inner side wall 113 and the outer side wall 115. The bottom wall 111 is formed with an opening 112, and the inner side wall 113 is located in the opening 112 of the bottom wall 111. The numbers of both the opening 112 and the inner side wall 113 herein are two, however, it is merely an example, and the numbers of the opening 112 and the inner side wall 113 may be adjusted based on practical requirements. The inner side wall 113 includes a first inner engaging structure 114.

The frame 120 includes an inner lateral wall 123 and an outer lateral wall 125 spaced from each other. As shown in FIG. 3, the foregoing description "an inner lateral wall 123 and an outer lateral wall 125 spaced from each other" indicates that there is a second spacing distance S2 between the inner lateral wall 123 and the outer lateral wall 125, such that a second accommodation space 127 is formed between the inner lateral wall 123 and the outer lateral wall 125. The inner lateral wall 123 includes a second inner engaging structure 124. When the frame assembly 100 is in the assembled state, the outer side wall 115 of the carrier 110 is engaged between the inner lateral wall 123 of the frame 120 and the outer lateral wall 125 of the frame 120, and the first inner engaging structure 114 of the inner side wall 113 is engaged with the second inner engaging structure 124 of the inner lateral wall 123 (the engaging of the first inner engaging structure 114 and the second inner engaging structure 124 is referred to as an inner engaging structure hereafter).

Figure 11:
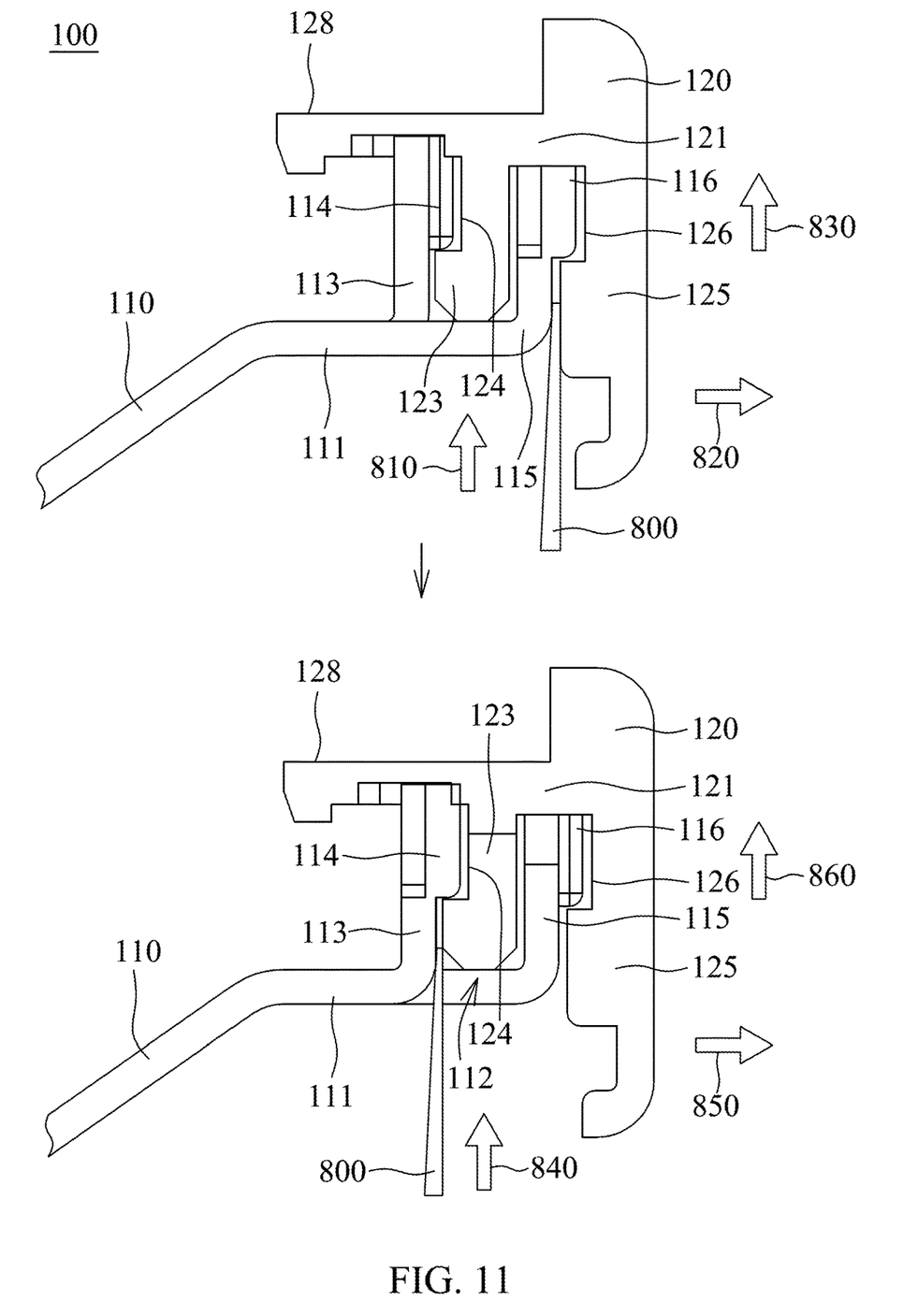
FIG. 11 is a schematic diagram of disassembling the frame assembly in FIG. 1.

With the abovementioned structure, the carrier 110 and the frame 120 of the frame assembly 100 may be engaged and secured with each other by the first inner engaging structure 114 and the second inner engaging structure 124 without using additional components, such as screws or buckles. This is advantageous for reducing assembling time and component cost while prevents the aesthetic issues due to exposure of screws. Further, the frame assembly 100 may be disassembled easily by using a disassembling tool (not shown) to free the first inner engaging structure 114 and the second inner engaging structure 124 from engaging. Details are illustrated with respect to FIG. 11.

The outer side wall 115 of the carrier 110 may further include a first outer engaging structure 116, and the outer lateral wall 125 of the frame 120 may further include a second outer engaging structure 126. As shown in FIG. 4, when the frame assembly 100 is in the assembled state, the first outer engaging structure 116 and the second outer engaging structure 126 are engaged with each other (the engaging of the first outer engaging structure 116 and the second outer engaging structure 126 is referred to as an outer engaging structure hereafter). With the double engaging of the inner engaging structure and the outer engaging structure, the assembling stability between the carrier 110 and the frame 120 is enhanced, and the carrier 110 and the frame 120 do not fall off easily, compared to a conventional single engaging structure.

More specifically, as shown in FIG. 1 and FIG. 3, the first accommodation space 117 of the carrier 110 is configured to accommodate the inner lateral wall 123 of the frame 120, such that the first inner engaging structure 114 and the second inner engaging structure 124 are engaged with each other. As shown in FIG. 1 and FIG. 4, the second accommodation space 127 of the frame 120 is configured to accommodate the outer side wall 115 of the carrier 110, such that the first outer engaging structure 116 and the second outer engaging structure 126 are engaged with each other.

As shown in FIG. 1, the first inner engaging structure 114 and the first outer engaging structure 116 of the carrier 110 are misaligned with each other along a first direction D1. In this way, the inner engaging structure and the outer engaging structure can be arranged alternatively, such that the assembling stability between the carrier 110 and the frame 120 is further increased.

As shown in FIG. 3, the frame 120 may further include a frame body 121. The inner lateral wall 123 and the outer lateral wall 125 both extend from the frame body 121, and the inner lateral wall 123 and the outer lateral wall 125 both extend from the frame body 121 in a joining direction D3 which is opposite to the upright direction D2. That is, a direction in which the inner lateral wall 123 and the outer lateral wall 125 extend outward from the frame body 121 is opposite to a direction in which the inner side wall 113 and the outer side wall 115 extend outward from the bottom wall 111. The frame 120 may be engaged with the carrier 110 along the joining direction D3 when assembling the frame 120 and the carrier 110. In this way, the frame assembly 110 has an advantage of being easy to assemble. The frame body 121 may further include a supporting portion 128, and an extension direction D4 of the supporting portion 128 is perpendicular to the joining direction D3. The supporting portion 128 may be configured to support other elements.

In the present embodiment, each of the first inner engaging structure 114 and the first outer engaging structure 116 is a protruding structure, each of the second inner engaging structure 124 and the second outer engaging structure 126 is a recessed structure, and a cross section of the protruding structure is a rectangular cross section. However, the present invention is not limited thereto. The first inner engaging structure 114, the first outer engaging structure 116, the second inner engaging structure 124, and the second outer engaging structure 126 may be any other shapes as long as the first inner engaging structure 114 and the second inner engaging structure 124 can be engaged with each other, and the first outer engaging structure 116 and the second outer engaging structure 126 can be engaged with each other.

More specifically, FIG. 1 merely illustrates the frame assembly 100 partially, i.e. a right part of the frame assembly 100 is illustrated, where only one side (called right-hand side hereafter) of the carrier 110 is illustrated. Other sides of the carrier 110 (not shown) may have the same structure as the right-hand side, and FIG. 1 merely illustrates a side frame of the frame 120 corresponding to the right-hand side of the carrier 110. The frame 120 may have other side frames (not shown) corresponding to the other sides of the carrier 110. Moreover, one engaging unit is included in the right part of the frame assembly 100 in FIG. 1 as an example. In the present embodiment, the engaging unit is composed of two inner engaging structures and one outer engaging structure, i.e. the engaging unit includes an inner engaging structure, an outer engaging structure, and an inner engaging structure sequentially along the first direction D1. However, the present invention is not limited thereto. For example, a plurality of engaging units may be included in the right-hand side of the frame assembly 100. For another example, the engaging unit may be composed of one inner engaging structure and one outer engaging structure. In this case, the engaging unit includes an inner engaging structure and an outer engaging structure sequentially along the first direction D1, or the engaging unit includes an outer engaging structure and an inner engaging structure sequentially along the first direction D1. For yet another example, the engaging unit may be composed of one inner engaging structure and two outer engaging structures. In this case, the engaging unit may include an outer engaging structure, an inner engaging structure, and an outer engaging structure sequentially along the first direction D1. The number of the engaging unit and the arrangement of the inner engaging structure and the outer engaging structure in an engaging unit may be adjusted flexibly based on practical requirements. Further, the carrier 110 may be a one piece formed structure. For example, the carrier 110 may be a sheet metal part formed by stamping. In this way, it is advantageous for reducing elements of the carrier 110, thereby simplifying the design of the carrier 110. The frame 120 may be an aluminum extrusion structure. In this way, it is advantageous for reducing the manufacturing cost, and aesthetic appearance of the frame assembly 100 is improved.

Figure 5:
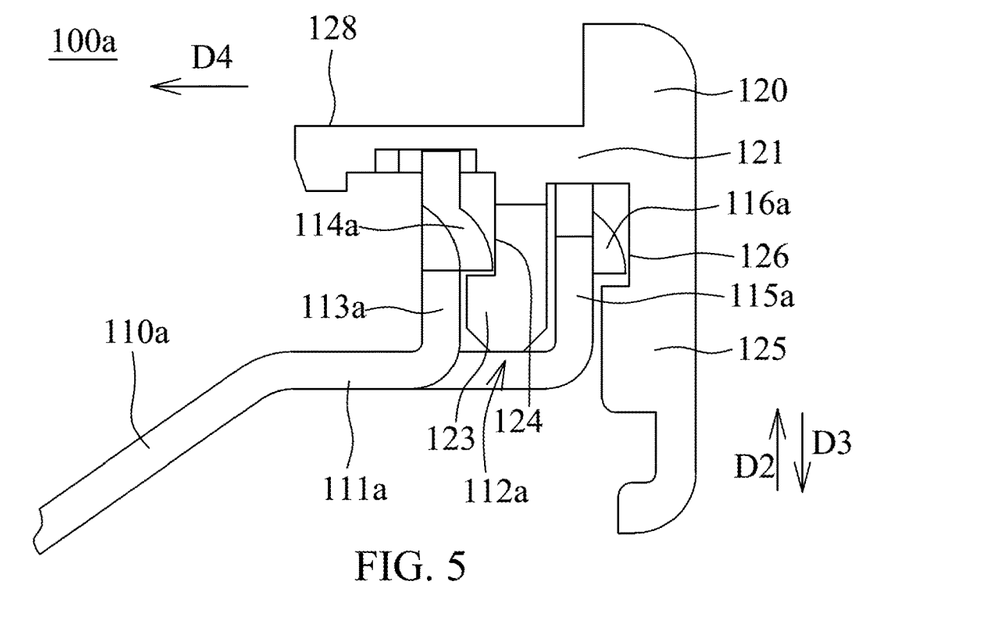
FIG. 5 is a cross-sectional schematic view of a frame assembly according to another embodiment of the present invention.
Figure 6:
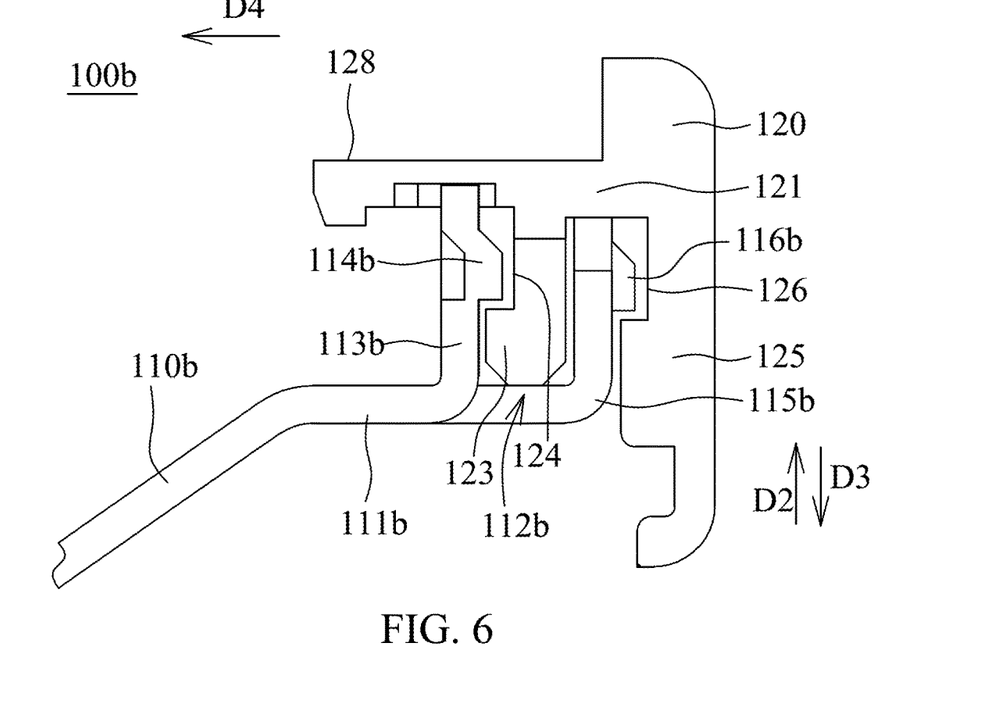
FIG. 6 is a cross-sectional schematic view of a frame assembly according to still another embodiment of the present invention.
Figure 7:
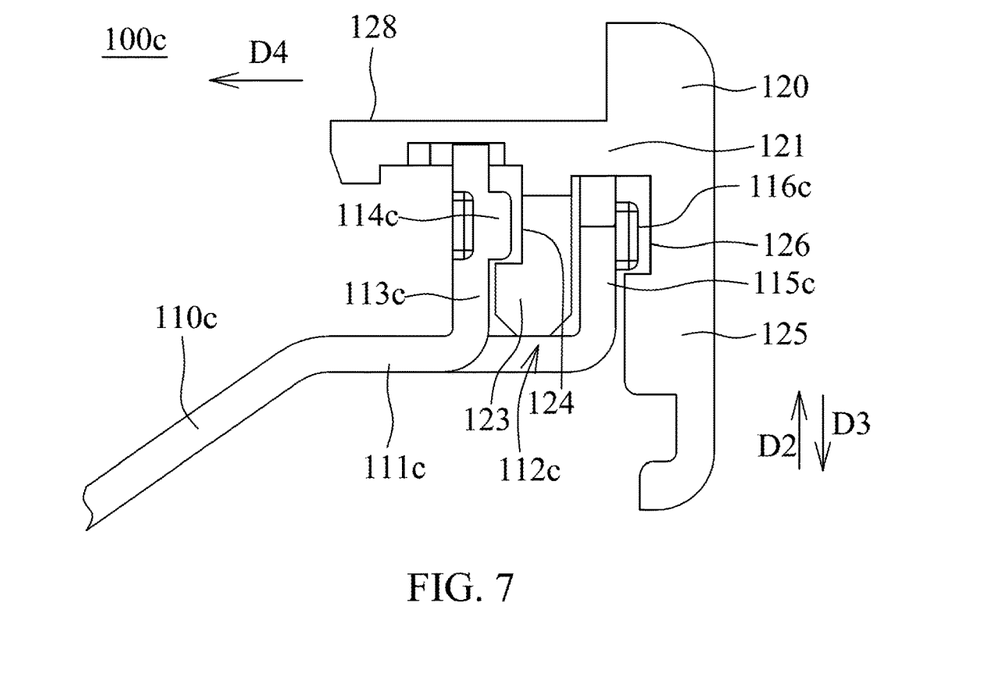
FIG. 7 is a cross-sectional schematic view of a frame assembly according to yet another embodiment of the present invention.

FIG. 5, FIG. 6, and FIG. 7 are cross-sectional schematic views of frame assemblies 100a, 100b, and 100c according to another embodiment of the present invention. The frame assemblies 100a, 100b, and 100c respectively include carriers 110a, 110b, and 110c, and each of the frame assemblies 100a, 100b, and 100c includes a frame 120. The carriers 110a, 110b, and 110c respectively include bottom walls 111a, 111b, and 111c, inner side walls 113a, 113b, and 113c, and outer side walls 115a, 115b and 115c. The bottom walls 111a, 111b, and 111c are respectively formed with openings 112a, 112b, and 112c. The inner side walls 113a, 113b, and 113c respectively include first inner engaging structures 114a, 114b, and 114c, and the outer side walls 115a, 115b, and 115c respectively include first outer engaging structures 116a, 116b, and 116c. Each of the first inner engaging structures 114a, 114b, and 114c and the first outer engaging structure 116a, 116b, and 116c is a protruding structure. It is noted that a cross section of the protruding structure shown in FIG. 5 is a curved section, a cross section of the protruding structure shown in FIG. 6 is a trapezoidal section, and a cross section of the protruding structure shown in FIG. 7 is a rectangular section. A length of the rectangular section in FIG. 7 in the upright direction D2 is less than a length of a rectangular section in FIG. 3 in the upright direction D2. Other details with respect to the frame assemblies 100a, 100b, and 100c may refer to the frame assemble 100.

Figure 8:
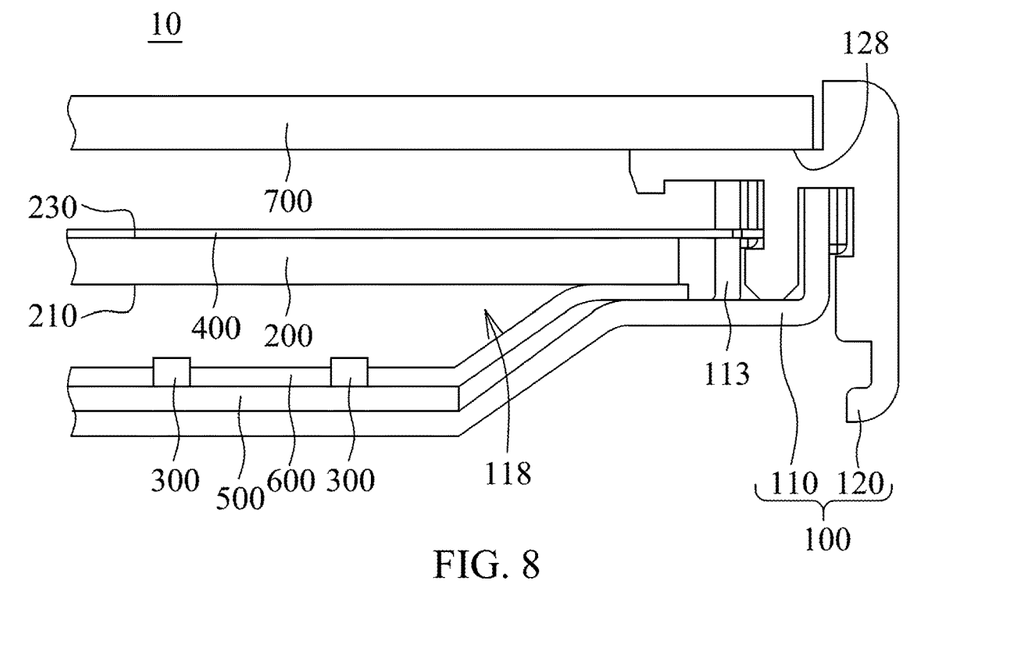
FIG. 8 is a cross-sectional schematic view of a display device according to yet another embodiment of the present invention.
Figure 9:
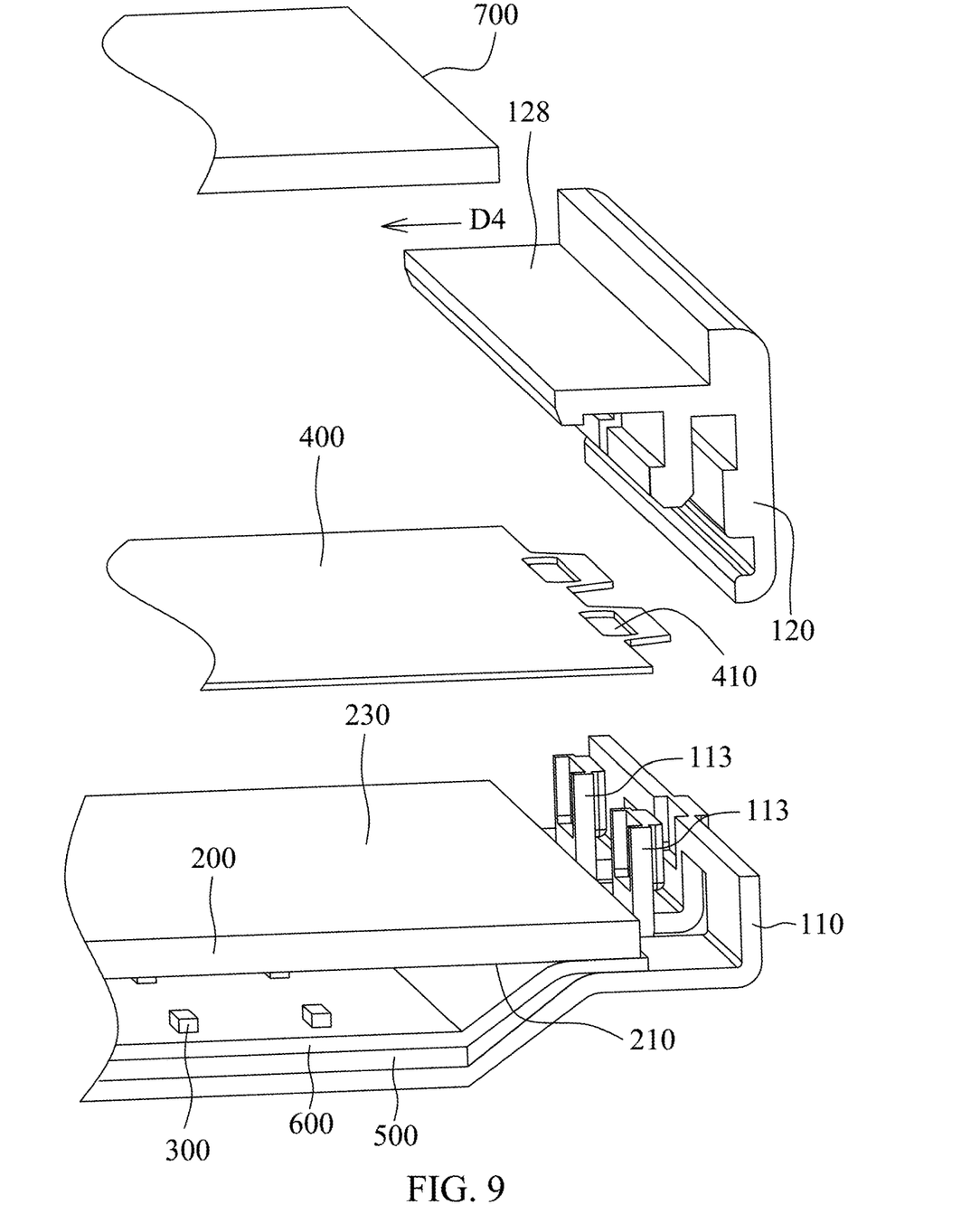
FIG. 9 is an exploded schematic view of the display device in FIG. 8.

Referring to FIG. 8 and FIG. 9, FIG. 8 is a cross-sectional schematic view of a display device 10 according to yet another embodiment of the present invention and FIG. 9 is an exploded schematic view of the display device 10 in FIG. 8. The display device 10 includes a backlight module (not labeled) and a display panel 700, and the backlight module is configured to provide the display panel 700 with light. The backlight module includes a frame assembly 100, an optical panel 200, and a light source 300. The optical panel 200 is disposed on the carrier 110, and the optical panel 200 includes a bottom surface 210 and a top surface 230. The optical panel 200 is configured to direct the light emitted by the light source 300 to the top surface 230 to be emitted. The light source 300 corresponds to the bottom surface 210 of the optical panel 200, that is, the backlight module in the present embodiment is a direct type backlight module.

More specifically, the display panel 700 is disposed over the frame 120, and the supporting portion 128 is configured to support the display panel 700. The display panel 700 may be an LCD panel. The bottom wall 111 of the carrier 110 is recessed to form a recessed space 118, and the light source 300 is disposed in the recessed space 118 and corresponds to the bottom surface 210 of the optical panel 200. Here, the light source 300 is, for example, a light emitting diode (LED), and the LED is disposed on a circuit board 500. The backlight module may further optionally include a reflector 600 and at least one optical film 400. The reflector 600 is disposed on the bottom wall 111 of the carrier 110. Here, the reflector 600 is disposed indirectly on the bottom wall 111 through the circuit board 500. The reflector 600 is configured to reflect the light emitted by the light source 300 into the optical panel 200 to enhance the utilization rate of the light. The optical film 400 is configured to improve the optical characteristics. The optical film 400 may be, but not limited to, a prism sheet (a condense sheet), a diffuse sheet, etc. The optical film 400 includes fitting holes 410, and the inner side walls 113 of the carrier 110 are embedded in the fitting holes 410. The number of the fitting holes 410, which corresponds to the number of the inner side walls 113, is set to be two. With the inner side walls 113 of the carrier 110 embedded in the fitting holes 410, the optical film 400 is secured on the carrier 110 without using additional components, which is advantageous for reducing assembling time and cost of the components. Further, the frame assembly 100 in the backlight module may be replaced with other frame assemblies according to the present invention, such as frame assemblies 100a, 100b, or 100c.

Figure 10:
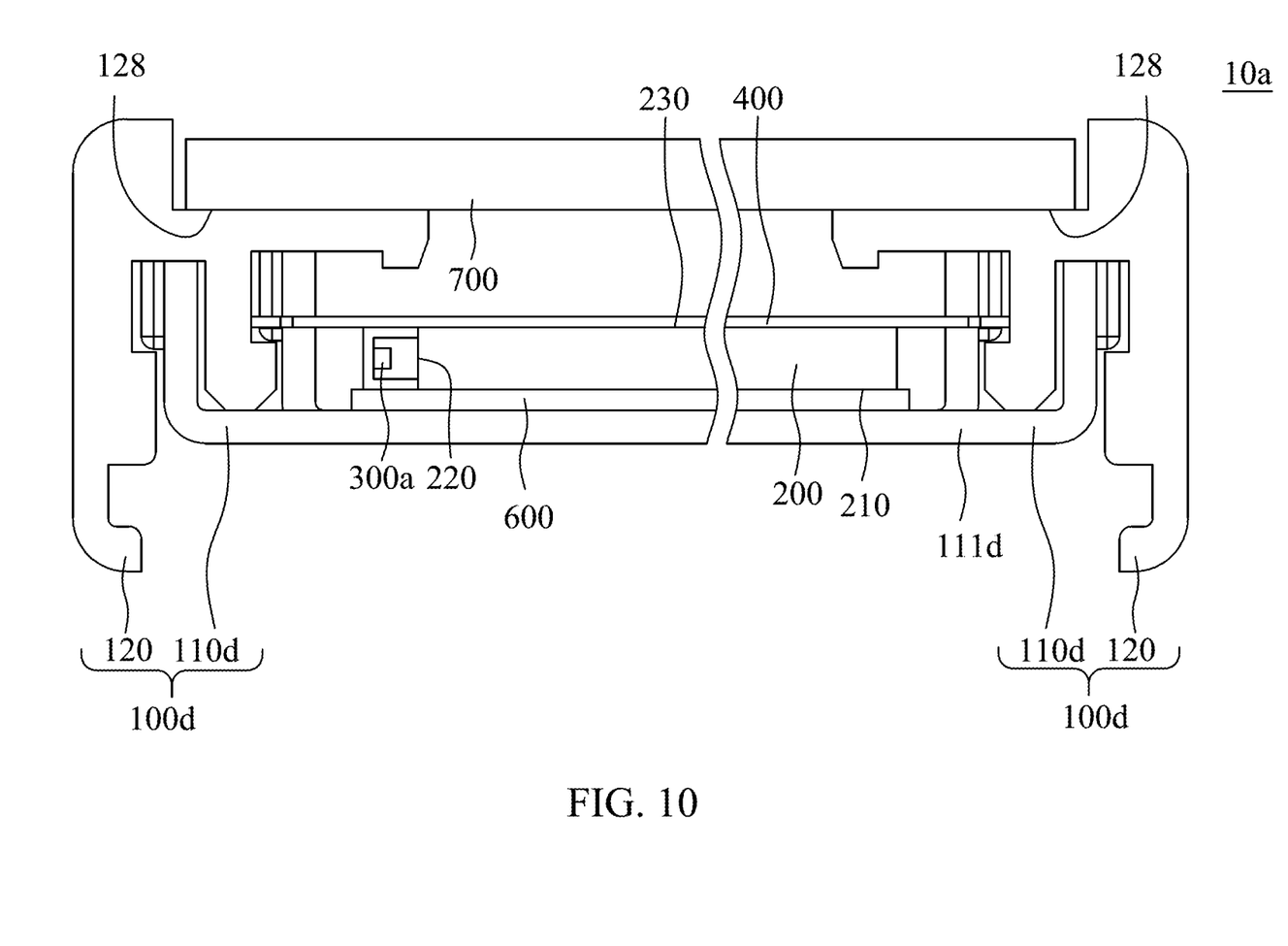
FIG. 10 is a cross-sectional schematic view of the display device according to yet another embodiment of the present invention.

Referring to FIG. 10, FIG. 10 is a cross-sectional schematic view of a display device 10a according to yet another embodiment of the present invention. The display device 10a includes a backlight module (not labeled) and a display panel 700. The backlight module includes a frame assembly 100d, an optical panel 200, and a light source 300a. The light source 300a corresponds to a side 220 of the optical panel 200, that is, the backlight module in the present embodiment is an edge type backlight module. Because there is no need for the bottom wall 111d of the carrier 110d to accommodate the light source 300a, the bottom wall 111d of the carrier 110d is a planar structure. In this way, it is advantageous for lightening and thinning the display device 10a. Other details with respect to the display device 10a may refer to the display device 10 and are not repeated.

Referring FIG. 1 to FIG. 4 and FIG. 11, FIG. 11 is a schematic diagram of disassembling the frame assembly 100 in FIG. 1. In disassembling of the frame assembly 100, the outer engaging structure (portion O in FIG. 2) may be disassembled prior to disassembling the inner engaging structure (portion I in FIG. 2), or the inner engaging structure may be disassembled prior to disassembling the outer engaging structure. When the outer engaging structure is disassembled, due to the absence of other components covering a gap between the outer side wall 115 and the outer lateral wall 125, a disassembling tool 800 may be inserted upward along a direction of an arrow 810 into the gap between the outer side wall 115 and the outer lateral wall 125, and then pushes the outer lateral wall 125 along a direction of an arrow 820 to free the outer lateral wall 125 from engaging along a direction of an arrow 830, thereby freeing the first outer engaging structure 116 and the second outer engaging structure 126 from engaging. Similarly, when the inner engaging structure is disassembled, due to an engaging position of the first inner engaging structure 114 and the second inner engaging structure being in the opening 112 of the bottom wall 111, the disassembling tool 800 may be inserted upward along a direction of an arrow 840 through the opening 112 into the gap between the inner side wall 113 and the inner lateral wall 123, and then pushes the inner lateral wall 123 along a direction of an arrow 850 to free the inner lateral wall 123 from engaging along a direction of an arrow 860, thereby freeing the first inner engaging structure 114 and the second inner engaging structure 124 from engaging. Because the frame assembly 100 is secured without using additional components, such as screws and buckles, there is no need to take down the additional components one by one when disassembling the frame assembly 100, so that the frame assembly 100 has the characteristics of easy disassembly. With the preferred design of two-layered engaging structure, the present invention further improves the stability, such that the carrier 110 and the frame 120 do not fall off easily. In disassembling for reworking, however, such a design of two-layered engaging structure makes a disassembling location of the inner engaging structure more unobserved than that of the outer engaging structure. In order to solve this problem, the present invention further utilizes the design of the opening 112 presented in the bottom wall 111 to have the disassembling tool 800 be inserted into the gap between the inner side wall 113 and the inner lateral wall 123 through the opening 112, such that the first inner engaging structure 114 and the second inner engaging structure 124 are free from engaging. In this way, a disassembling operation of the inner engaging structure in disassembling for reworking is completed fast and simply.

In contrast to the prior arts, the present invention provides a frame assembly, and a backlight module and a display device including the frame assembly. The frame assembly may be secured without using additional components, which is advantageous for reducing assembling time and cost of components, and is aesthetic and easy for disassembling.

The aforementioned contents are merely preferred embodiments of the present invention, and it is intended that the present invention covers modifications and variations of this invention provided they fall within the scope of the following claims.

What is claimed is:

1. A frame assembly, comprising:
   a carrier, comprising:
      a bottom wall formed with an opening;
      an inner side wall located in the opening and extending from the bottom wall along an upright direction away from the bottom wall, the inner side wall comprising a first inner engaging structure; and
      an outer side wall extending from the bottom wall along the upright direction and spaced from the inner side wall, the outer side wall comprising a first outer engaging structure; and
   a frame, comprising:
      a frame body;
      an inner lateral wall extending from the frame body, the inner lateral wall comprising a second inner engaging structure; and
      an outer lateral wall extending from the frame body and spaced from the inner lateral wall, the outer lateral wall comprising a second outer engaging structure,
   wherein the first inner engaging structure and the second inner engaging structure are engaged with each other, and the first outer engaging structure and the second outer engaging structure are engaged with each other.

2. The frame assembly of claim 1, wherein a first accommodation space is formed between the inner side wall and the outer side wall of the carrier, and a second accommodation space is formed between the inner lateral wall and the outer lateral wall of the frame, wherein the first accommodation space of the carrier is configured to accommodate the inner lateral wall of the frame such that the first inner engaging structure and the second inner engaging structure are engaged with each other, and the second accommodation space of the frame is configured to accommodate the outer lateral wall of the carrier such that the first outer engaging structure and the second outer engaging structure are engaged with each other.

3. The frame assembly of claim 1, wherein the first inner engaging structure and the first outer engaging structure are misaligned with each other along a first direction.

4. The frame assembly of claim 1, wherein the inner lateral wall and the outer lateral wall of the frame extend toward a joining direction, and the frame is engaged with the carrier along the joining direction.

5. A backlight module, comprising:
   the frame assembly of claim 1;
   an optical panel disposed on the carrier, the optical panel comprising a bottom surface and at least one side; and
   a light source corresponding to the bottom surface or the at least one side of the optical panel.

6. The backlight module of claim 5, wherein the bottom wall of the carrier is recessed to form a recessed space, and the light source is disposed in the recessed space and corresponds to the bottom surface of the optical panel.

7. The backlight module of claim 5, further comprising:
   at least one optical film comprising a fitting hole, the inner side wall of the carrier being embedded in the fitting hole.

8. A display device, comprising:
   the backlight module of claim 5; and
   a display panel disposed over the backlight module.

9. The display device of claim 8, wherein the frame body further comprises:
   a supporting portion, wherein the inner lateral wall and the outer lateral wall extend toward a joining direction, an extension direction of the supporting portion is perpendicular to the joining direction, and the supporting portion is configured to support the display panel.

10. A frame assembly, comprising:
    a carrier comprising a bottom wall, and an inner side wall and an outer side wall which extend away from the bottom wall along an upright direction and are spaced from each other, wherein the bottom wall is formed with an opening, and the inner side wall comprises a first inner engaging structure; and
    a frame comprising an inner lateral wall and an outer lateral wall spaced from each other, the inner lateral wall comprising a second inner engaging structure,
    wherein the outer side wall of the carrier is engaged between the inner lateral wall of the frame and the outer lateral wall of the frame, and the first inner engaging structure of the inner side wall and the second inner engaging structure of the inner lateral wall are engaged with each other and located in the opening of the bottom wall.

11. The frame assembly of claim 10, wherein the outer side wall of the carrier comprises a first outer engaging structure, the outer lateral wall of the frame comprises a second outer engaging structure, and the first outer engaging structure and the second outer engaging structure are engaged with each other.

12. The frame assembly of claim 11, wherein a first accommodation space is formed between the inner side wall and the outer side wall of the carrier, and a second accommodation space is formed between the inner lateral wall and the outer lateral wall of the frame, wherein the first accommodation space of the carrier is configured to accommodate the inner lateral wall of the frame such that the first inner engaging structure and the second inner engaging structure are engaged with each other, and the second accommodation space of the frame is configured to accommodate the outer side wall of the carrier such that the first outer engaging structure and the second outer engaging structure are engaged with each other.

13. The frame assembly of claim 11, wherein the first inner engaging structure and the first outer engaging structure are misaligned with each other along a first direction.

14. The frame assembly of claim 10, wherein the inner lateral wall and the outer lateral wall of the frame extend toward a joining direction, and the frame is engaged with the carrier along the joining direction.

15. A backlight module, comprising:
    the frame assembly of claim 10;
    an optical panel disposed on the carrier, the optical panel comprising a bottom surface and at least one side; and
    a light source corresponding to the bottom surface or the at least one side of the optical panel.

16. The backlight module of claim 15, wherein the bottom wall of the carrier is recessed to form a recessed space, and the light source is disposed in the recessed space and corresponds to the bottom surface of the optical panel.

17. The backlight module of claim 15, further comprising:
    at least one optical film comprising a fitting hole, the fitting hole being embedded in the inner side wall of the carrier.

18. A display device, comprising:
    the backlight module of claim 15; and
    a display panel disposed over the backlight module.

19. The display device of claim 18, wherein the frame further comprises:
    a supporting portion, wherein the inner lateral wall and the outer lateral wall extend toward a joining direction, wherein an extension direction of the supporting port is perpendicular to the joining direction, and the supporting portion is configured to support the display panel.

* * * * *